(12) United States Patent
Lin

(10) Patent No.: US 12,376,057 B2
(45) Date of Patent: Jul. 29, 2025

(54) APPARATUS AND METHOD OF TIMING ADVANCE INDICATION OF SAME

(71) Applicant: GUANGDONG OPPO MOBILE TELECOMMUNICATIONS CORP., LTD., Dongguan (CN)

(72) Inventor: Hao Lin, Neuilly sur Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 329 days.

(21) Appl. No.: 17/817,901

(22) Filed: Aug. 5, 2022

(65) Prior Publication Data

US 2022/0394648 A1 Dec. 8, 2022

Related U.S. Application Data

(63) Continuation of application No. PCT/IB2020/000455, filed on Feb. 7, 2020.

(51) Int. Cl.
*H04W 56/00* (2009.01)

(52) U.S. Cl.
CPC .............. *H04W 56/0045* (2013.01)

(58) Field of Classification Search
CPC .............. H04W 56/0045; H04L 5/14
See application file for complete search history.

(56) References Cited

U.S. PATENT DOCUMENTS

| | | | | |
|---|---|---|---|---|
| 9,007,994 | B2* | 4/2015 | Kreuzer | H04W 52/146 370/328 |
| 11,184,872 | B2* | 11/2021 | Prakash | H04W 56/004 |
| 11,832,203 | B2* | 11/2023 | Choi | H04W 72/21 |
| 2019/0068341 | A1 | 2/2019 | Seo et al. | |
| 2019/0090262 | A1 | 3/2019 | Yan et al. | |
| 2019/0141697 | A1* | 5/2019 | Islam | H04W 56/0045 |
| 2019/0342845 | A1* | 11/2019 | Laselva | H04B 7/18504 |
| 2020/0322976 | A1* | 10/2020 | Islam | H04W 56/0045 |
| 2021/0345281 | A1* | 11/2021 | Yang | H04B 7/1851 |
| 2022/0124795 | A1* | 4/2022 | Wu | H04W 56/0045 |
| 2022/0201631 | A1* | 6/2022 | Wu | H04W 56/0005 |
| 2022/0330191 | A1* | 10/2022 | Shin | G01S 19/256 |
| 2022/0338111 | A1* | 10/2022 | Edge | H04B 7/18513 |
| 2022/0408387 | A1* | 12/2022 | Chang | H04W 56/001 |

FOREIGN PATENT DOCUMENTS

| | | | |
|---|---|---|---|
| EP | 3425835 | A1 | 1/2019 |
| EP | 3468266 | A1 | 4/2019 |

OTHER PUBLICATIONS

Hearing Notice of the Indian application No. 202227046526, issued on May 21, 2024. 2 pages with English translation.
Office Action of the Indian application No. 202227046526, issued on Nov. 22, 2022. 6 pages with English translation.
(Continued)

*Primary Examiner* — Bailor C Hsu
(74) *Attorney, Agent, or Firm* — PERKINS COIE LLP

(57) ABSTRACT

An apparatus and a method of a timing advance (TA) indication of the same are provided. A method of a TA indication of a base station includes determining a first TA information, and broadcasting, to user equipments (UEs), the first TA information.

20 Claims, 6 Drawing Sheets

200

202 → Determining a first TA information

204 → Broadcasting, to user equipments (UEs), the first TA information

(56) References Cited

OTHER PUBLICATIONS

Huawei et al: "Discussion on Doppler compensation, timing advance and RACH for NTN", 3GPP TSG RAN WG1 Meeting #98 R1-1908049, Prague, Czech Republic, Aug. 26-30, 2019. (36 pages).
Nokia et al: "Doppler Compensation, Uplink Timing Advance and Random Access in NTN", 3GPP TSG RAN WG1 #99 R1-1913017, Reno, USA, Nov. 18-22, 2019. (28 pages).
ETRI: "Discussion on Timing Advance for NTN", 3GPP TSG RAN WG1 #98 R1-1908812, Prague, CZ, Aug. 26-30, 2019. (3 pages).
ZTE Corporation et al: "TP on RACH capacity evaluation and procedures", 3GPP TSG-RAN WG2 Meeting#107bis R2-1914069, Chongqing, China, Oct. 14-18, 2019. (9 pages).
ZTE: "Summary#2 of 7.2.5.3 on UL timing and PRACH for NTN", 3GPP TSG RAN WG1 #98bis R1-1911477, Chongqing, China, 14th-20th, 2019. (13 pages).
International Search Report in the international application No. PCT/IB2020/000455, malled on Dec. 16, 2020. (8 pages).
Written Opinion of the International Search Authority in the international application No. PCT/IB2020/000455, mailed on Dec. 16, 2020. (14 pages).

\* cited by examiner

APPARATUS AND METHOD OF TIMING ADVANCE INDICATION OF SAME

CROSS-REFERENCE TO RELATED APPLICATION

This is a continuation application of International Patent Application No. PCT/IB2020/000455, filed on Feb. 7, 2020, entitled "APPARATUS AND METHOD OF TIMING ADVANCE INDICATION OF SAME", the disclosure of which is hereby incorporated by reference in its entirety.

BACKGROUND OF DISCLOSURE

1. Description of the Related Art

Non-terrestrial networks (NTNs) refer to networks, or segments of networks, using a spaceborne vehicle or an airborne vehicle for transmission. Spaceborne vehicles include satellites including low earth orbiting (LEO) satellites, medium earth orbiting (MEO) satellites, geostationary earth orbiting (GEO) satellites, and highly elliptical orbiting (HEO) satellites. Airborne vehicles include high altitude platforms (HAPs) encompassing unmanned aircraft systems (UAS) including lighter than air (LTA) unmanned aerial systems (UAS) and heavier than air (HTA) UAS, all operating in altitudes typically between 8 and 50 km, quasi-stationary.

Communication via a satellite is an interesting means thanks to its well-known coverage, which can bring the coverage to locations that normally cellular operators are not willing to deploy either due to non-stable crowd potential client, e.g. extreme rural, or due to high deployment cost, e.g. middle of ocean or mountain peak. Nowadays, the satellite communication is a separate technology to a 3rd generation partnership project (3GPP) cellular technology. Coming to 5G era, these two technologies can merge together, i.e. we can imagine to have a 5G terminal that can access to a cellular network and a satellite network. The NTN can be good candidate technology for this purpose. It is to be designed based on 3GPP new radio (NR) with necessary enhancement.

In NTN, due to very high satellite altitude, a round trip time (RTT) between a sender (satellite/user equipment (UE)) and a receiver (UE/satellite) is extremely long. In a release. 15 NR, the RTT is usually compensated by a timing advance (TA). However, in the NTN, a long RTT will result in a very long TA. How to indicate this long TA is still an open issue.

Therefore, there is a need for an apparatus (such as a user equipment (UE) and/or a base station) and a method of a timing advance (TA) indication of the same, which can solve issues in the prior art, provide a good communication performance and high reliability.

SUMMARY

The present disclosure relates to the field of communication systems, and more particularly, to an apparatus (such as a user equipment (UE) and/or a base station) and a method of a timing advance (TA) indication of the same, which can provide a good communication performance and high reliability.

In a first aspect of the present disclosure, a method of a timing advance (TA) indication of a base station includes transmitting, to user equipments (UEs), the first TA information.

In a second aspect of the present disclosure, base station of a timing advance (TA) indication includes a memory, a transceiver, and a processor coupled to the memory and the transceiver. The processor is configured to: control the transceiver to transmit, to user equipments (UEs), a first TA information.

In a third aspect of the present disclosure, a method of a timing advance (TA) indication of a user equipment includes receiving a first TA information from a base station and applying the first TA for random access channel (RACH) preamble transmission.

In a fourth aspect of the present disclosure, a user equipment of a timing advance (TA) indication includes a memory, a transceiver, and a processor coupled to the memory and the transceiver. The processor is configured to: control the transceiver to receive a first TA information from a base station, and apply the first TA for random access channel (RACH) preamble transmission.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
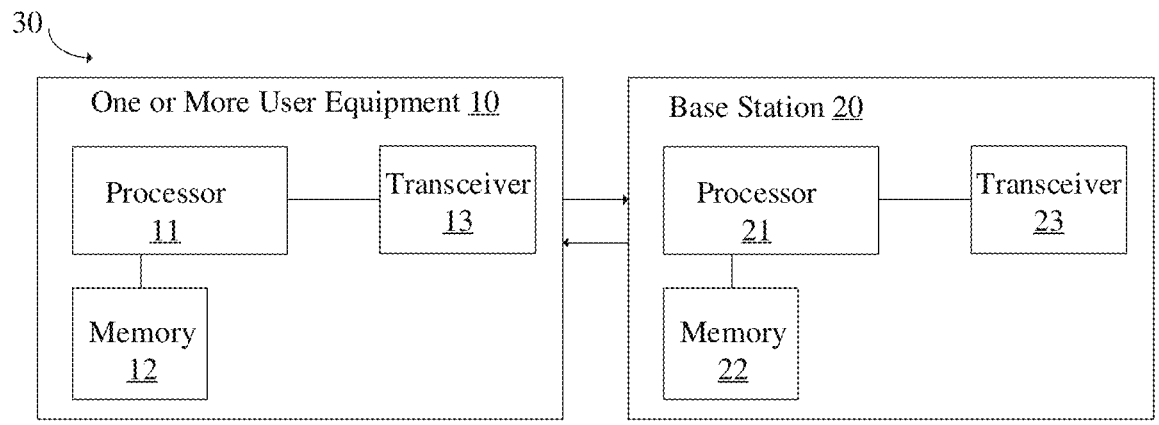
FIG. 1 is a block diagram of one or more user equipments (UE) and a network (e.g., gNB) of a timing advance (TA) indication in a communication network system according to an embodiment of the present disclosure.

FIG. 1 illustrates that, in some embodiments, one or more user equipments (UEs) 10 and a base station (e.g., gNB) 20 of a timing advance (TA) indication in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to: determine a first TA information (for example, the base station 20 derives the first TA information), and control the transceiver to broadcast, to user equipments (UEs), the first TA information. In some embodiments, the base station 20 also broadcasts, to the UEs, a reference point information based on which base station 20 derives the first TA information. This can provide a suitable TA indication in a non-terrestrial network (NTN) system.

In some embodiments, the processor 21 is configured to: control the transceiver to receive a first TA information through a broadcast from a base station, and applying the first TA information (this may be an obtained TA or a derived TA) for random access channel (RACH) preamble transmission. In some embodiments, the UE 10 also receives a reference point information from the base station 20. This can provide a suitable TA indication in a non-terrestrial network (NTN) system.

In some embodiments, the processor 21 is configured to: control the transceiver 23 to transmit, to user equipments (UEs), a first TA information. This can provide a suitable TA indication in a non-terrestrial network (NTN) system.

In some embodiments, the processor is configured to determine the first TA information. In some embodiments, the first TA information is transmitted through broadcast. In some embodiments, the first TA information indicates a same TA to at least two of the UEs. In some embodiments, the first TA information comprises a timing advance value. In some embodiments, the timing advance value comprises a time length of timing advance. In some embodiments, the timing advance value comprises one or more pre-defined time granularities (such as an absolute time unit or multiple of a pre-defined time granularity). In some embodiments, the timing advance value equals to: N times Ts, where N is the number and Ts is the time granularity. In some embodiments, the first TA information comprises a location of the base station. In some embodiments, the first TA information comprises an auxiliary information associated to the location of the base station. In some embodiments, the auxiliary information comprises satellite ephemeris data. In some embodiments, the first TA information is broadcasted using a cell specific indication. In some embodiments, the first TA information comprises one or more timing advance values, each timing advance value respectively corresponding to a time interval. In some embodiments, the first TA information further comprises: one or more time intervals, and corresponding relation between the one or more timing advance values and the one or more time intervals. In some embodiments, a role of each timing advance value is to use a timing advance value within its corresponding time interval. After the time interval is switched, the timing advance value should also be switched to a TA corresponding to an updated time interval.

In some embodiments, the first TA information further comprises an auxiliary information suitable for one or more moving UEs of the UEs 10. In some embodiments, the auxiliary information corresponds to the one or more timing advance values, and/or to the one or more time intervals. In some embodiments, the auxiliary information comprises a beam information. In some embodiments, the beam information comprises at least one of: a beam identifier; a synchronization signal block (SSB) identifier; a channel state information reference signal (CSI-RS) resource identifier; and a reference signal. In some embodiments, the processor 21 is configured to indicate, to the UEs 10, a second TA information. In some embodiments, the second TA information is carried in a random access response (RAR). In some embodiments, the second TA information comprises residual TAs specific to the UEs.

In some embodiments, the second TA information comprises a second timing advance value. In some embodiments, the residual TAs specific to at least two of the UEs 10 are different. In some embodiments, the processor 21 is configured to control the transceiver 23 to inform the UEs 10 to apply the first TA information and the second TA information. In some embodiments, the processor 21 is configured to control the transceiver 23 to inform one or more non-global navigation satellite system (non-GNSS) UEs of the UEs to apply the first TA information and the second TA information. In some embodiments, the processor 21 is configured to control the transceiver 23 to receive a feedback that the indicated TA information is applied on one or more of the UEs 10 form the one or more of the UEs 10. In some embodiments, the feedback is an explicit feedback or an implicit feedback. In some embodiments, the explicit feedback uses 1-bit to indicate that the indicated TA information is applied on the one or more of the UEs and the first TA information and the second TA information are not applied on the one or more of the UEs. In some embodiments, the implicit feedback uses different group of preamble sequences to indicate that the indicated TA information is applied on the one or more of the UEs and the first TA information and the second TA information are not applied on the one or more of the UEs.

In some embodiments, the processor 21 is configured to control the transceiver 23 to receive a preamble with the first TA information being applied from one or more of the UEs 10 before indicating, to the UEs 10, the second TA information, wherein the determined first TA information refers that the first TA information are determined by the one or more of the UEs 10. In some embodiments, the processor 21 is configured to determine the second TA information according to the preamble and the determined first TA information.

Figure 2:
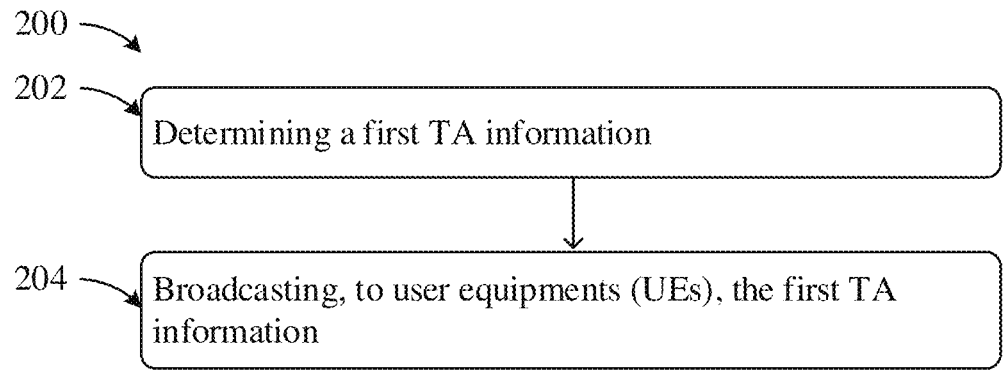
FIG. 2 is a flowchart illustrating a method of a timing advance (TA) indication of a base station according to an embodiment of the present disclosure.

FIG. 2 illustrates a method 200 of a timing advance (TA) indication of a base station 20 according to an embodiment of the present disclosure. In some embodiments, the method 200 includes: a block 202, determining a first TA information, and a block 204, broadcasting, to user equipments (UEs), the first TA information. This can provide a suitable TA indication in a non-terrestrial network (NTN) system.

Figure 3:
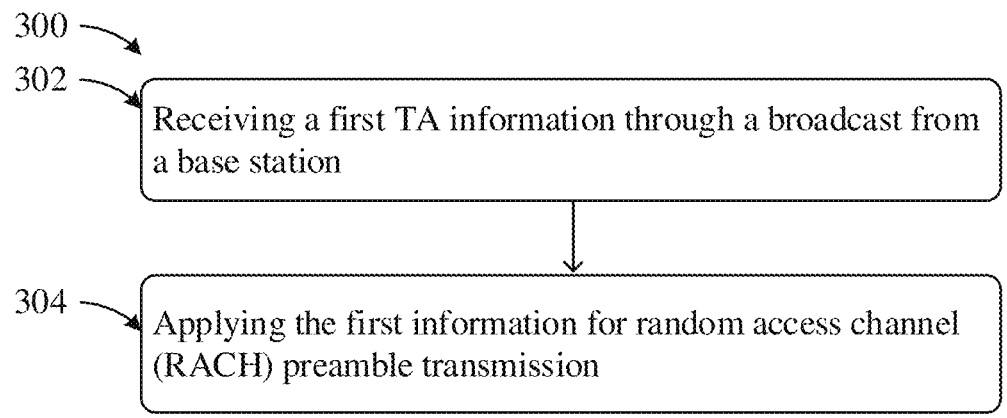
FIG. 3 is a flowchart illustrating a method of a timing advance (TA) indication of a UE according to an embodiment of the present disclosure.

FIG. 3 illustrates a method 300 of a timing advance (TA) indication of a UE 10 according to an embodiment of the present disclosure. In some embodiments, the method 300 includes: a block 302, receiving a first TA information through a broadcast from a base station, and a block 304, applying the first information (this may be an obtained TA or a derived TA) for random access channel (RACH) preamble transmission. This can provide a suitable TA indication in a non-terrestrial network (NTN) system.

Figure 4:
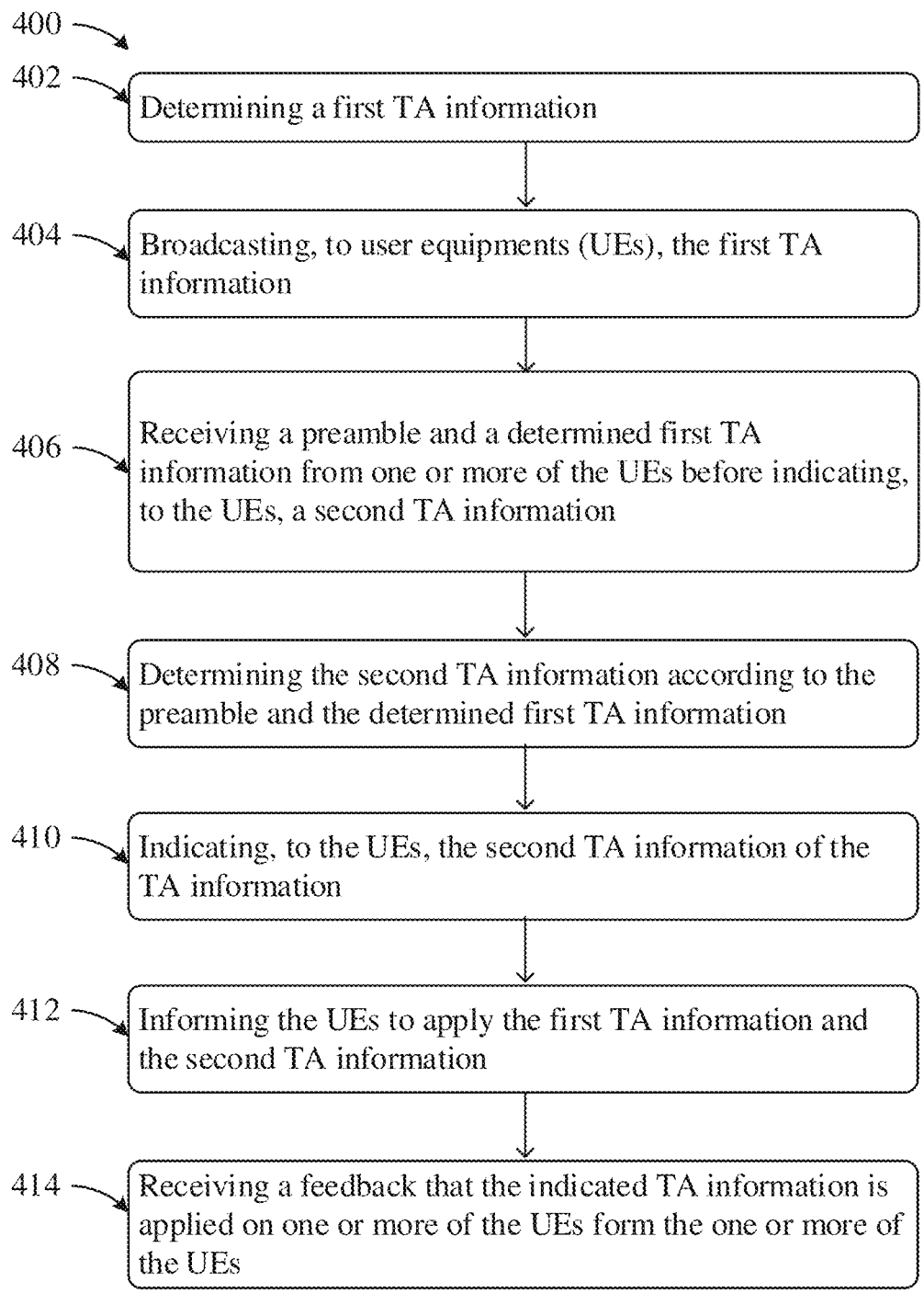
FIG. 4 is a flowchart illustrating a method of a timing advance (TA) indication of a base station according to another embodiment of the present disclosure.

FIG. 4 illustrates a method 400 of a timing advance (TA) indication of a base station 20 according to another embodiment of the present disclosure. In some embodiments, the method 400 includes: a block 402, determining a first TA information, a block 404, broadcasting, to user equipments (UEs), the first TA information, a block 406, receiving a preamble and a determined first TA information from one or more of the UEs before indicating, to the UEs, a second TA information, wherein the determined first TA information refers that the first TA information are determined by the one or more of the UEs, a block 408, determining the second TA information according to the preamble and the determined first TA information, a block 410, indicating, to the UEs, the second TA information, a block 412, informing the UEs to apply the first TA information and the second TA information, and a block 414, receiving a feedback that the indicated TA information is applied on one or more of the UEs form the one or more of the UEs. This can provide a suitable TA indication in a non-terrestrial network (NTN) system.

Figure 5:
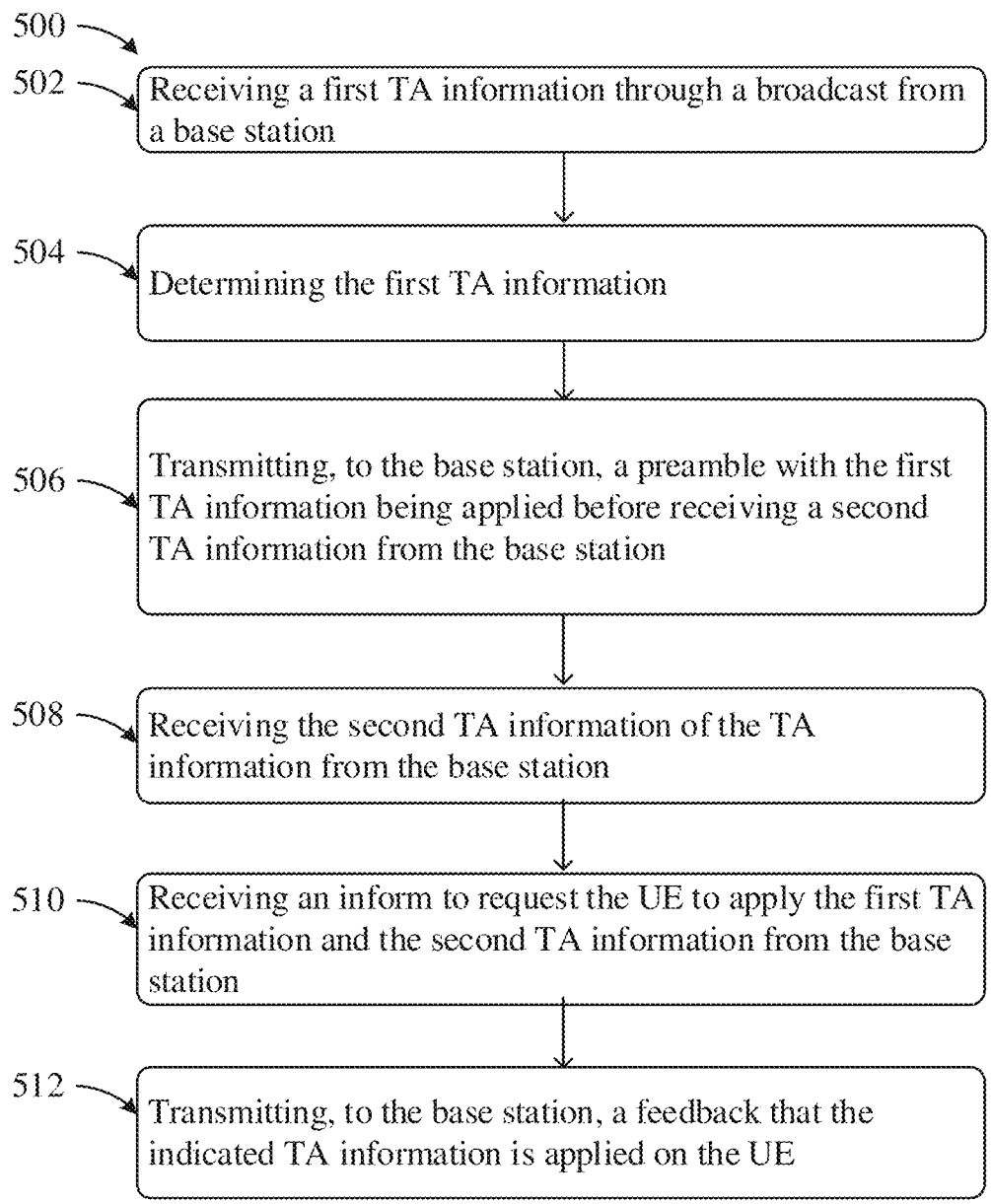
FIG. 5 is a flowchart illustrating a method of a timing advance (TA) indication of a UE according to another embodiment of the present disclosure.

FIG. 5 illustrates a method 500 of a timing advance (TA) indication of a UE 10 according to another embodiment of the present disclosure. In some embodiments, the method 500 includes: a block 502, receiving a first TA information through a broadcast from a base station, a block 504, determining the first TA information, a block 506, transmitting, to the base station, a preamble with the first TA information being applied before receiving a second TA information from the base station, wherein the determined first TA information refers that the first TA information are determined by the UE, a block 508, receiving the second TA information from the base station, a block 510, receiving an inform to request the UE to apply the first TA information and the second TA information from the base station, and a block 512, transmitting, to the base station, a feedback that the indicated TA information is applied on the UE. This can provide a suitable TA indication in a non-terrestrial network (NTN) system.

In some embodiments, the method comprises transmitting, to user equipments (UEs), a first TA information. This can provide a suitable TA indication in a non-terrestrial network (NTN) system.

In some embodiments, the method further comprises determining the first TA information. In some embodiments, the first TA information is transmitted through broadcast. In some embodiments, the first TA information indicates a same TA to at least two of the UEs. In some embodiments, the first TA information comprises a timing advance value. In some embodiments, the timing advance value comprises a time length of timing advance. In some embodiments, the timing advance value comprises one or more pre-defined time granularities (such as an absolute time unit or multiple of a pre-defined time granularity). In some embodiments, the timing advance value equals to: N times Ts, where N is the number and Ts is the time granularity. In some embodiments, the first TA information comprises a location of the base station. In some embodiments, the first TA information comprises an auxiliary information associated to the location of the base station. In some embodiments, the auxiliary information comprises satellite ephemeris data. In some embodiments, the first TA information is broadcasted using a cell specific indication. In some embodiments, the first TA information comprises one or more timing advance values, each timing advance value respectively corresponding to a time interval. In some embodiments, the first TA information further comprises: one or more time intervals, and corresponding relation between the one or more timing advance values and the one or more time intervals. In some embodiments, a role of each timing advance value is to use a timing advance value within its corresponding time interval. After the time interval is switched, the timing advance value should also be switched to a TA corresponding to an updated time interval.

In some embodiments, the first TA information further comprises an auxiliary information suitable for one or more moving UEs of the UEs. In some embodiments, the auxiliary information corresponds to the one or more timing advance values, and/or to the one or more time intervals. In some embodiments, the auxiliary information comprises a beam information. In some embodiments, the beam information comprises at least one of: a beam identifier; a synchronization signal block (SSB) identifier; a channel state information reference signal (CSI-RS) resource identifier; and a reference signal. In some embodiments, the method further comprises indicating, to the UEs, a second TA information. In some embodiments, the second TA information is carried in a random access response (RAR). In some embodiments, the second TA information comprises residual TAs specific to the UEs.

In some embodiments, the second TA information comprises a second timing advance value. In some embodiments, the residual TAs specific to at least two of the UEs are different. In some embodiments, the method further comprises informing the UEs to apply the first TA information and the second TA information. In some embodiments, the method further comprises informing one or more non-global navigation satellite system (non-GNSS) UEs of the UEs to apply the first TA information and the second TA information. In some embodiments, the method further comprises receiving a feedback that the indicated TA information is applied on one or more of the UEs form the one or more of the UEs. In some embodiments, the feedback is an explicit feedback or an implicit feedback. In some embodiments, the explicit feedback uses 1-bit to indicate that the indicated TA information is applied on the one or more of the UEs and the first TA information and the second TA information are not applied on the one or more of the UEs. In some embodiments, the implicit feedback uses different group of preamble sequences to indicate that the indicated TA information is applied on the one or more of the UEs and the first TA information and the second TA information are not applied on the one or more of the UEs.

In some embodiments, the method further comprises receiving a preamble with the first TA information being applied from one or more of the UEs 10 before indicating, to the UEs, the second TA information, wherein the determined first TA information refers that the first TA information are determined by the one or more of the UEs. In some embodiments, the method further comprises determining the second TA information according to the preamble and the determined first TA information.

In some embodiments, the first TA information indicates a same TA to all of the UEs. In some embodiments, the first TA information comprises a direct indication, the direct indication comprises a TA value using an absolute time unit or using multiple of a pre-defined time granularity. In this example, the base station 20 (such as gNB) uses cell specific indication to broadcast the first TA information. The first TA information can be a timing advance value in terms of absolute time unit, e.g. millisecond or microsecond, or multiple of a pre-defined time granularity, i.e. N*Ts, where N is the broadcasted TA information and Ts is a pre-defined time granularity.

In some embodiments, the first TA information comprises an indirect indication, the indirect indication comprises auxiliary information relevant for TA derivation. In some embodiments, the auxiliary information is satellite ephemeris data.

In this example, alternatively, the broadcasted first TA information can be related to the satellite ephemeris data, based on which the UE 10 can estimate a TA value.

In some embodiments, the first TA information is broadcasted using a cell specific indication.

In some embodiments, a determination on the indicated TA information of the UE is associated with pairing the indicated TA information, a time interval, and a beam index. In some embodiments, the determination on the indicated TA information of the UE comprises that the UE determines the indicated TA information based on a present time interval and a received beam.

Figure 6:
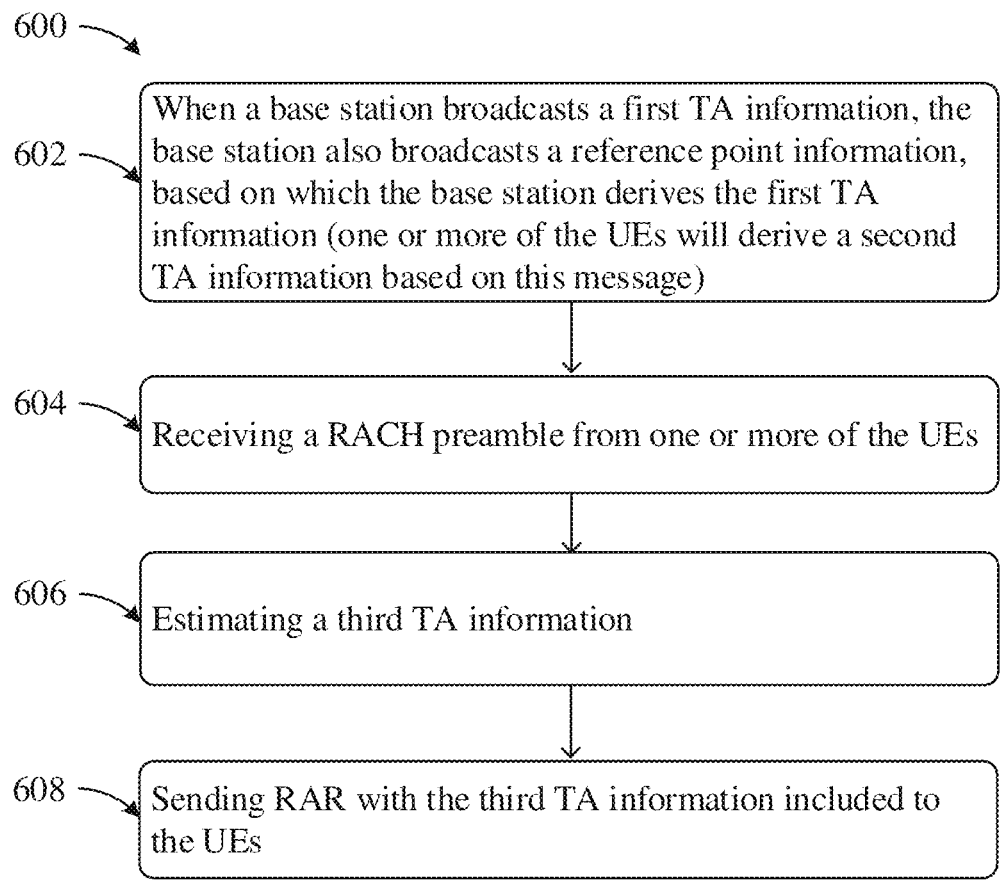
FIG. 6 is a flowchart illustrating a method of a timing advance (TA) indication of a base station according to another embodiment of the present disclosure.

FIG. 6 illustrates a method 600 of a timing advance (TA) indication of a base station 20 according to another embodiment of the present disclosure. In some embodiments, the method 600 includes: a block 602, when a base station broadcasts a first TA information, the base station also broadcasts a reference point information, based on which the base station derives the first TA information (one or more of the UEs will derive a second TA information based on this message), a block 604, receiving a RACH preamble from one or more of the UEs, a block 606, estimating a third TA information, and a block 608, sending RAR with the third TA information included to the UEs. This can provide a suitable TA indication in a non-terrestrial network (NTN) system.

Figure 7:
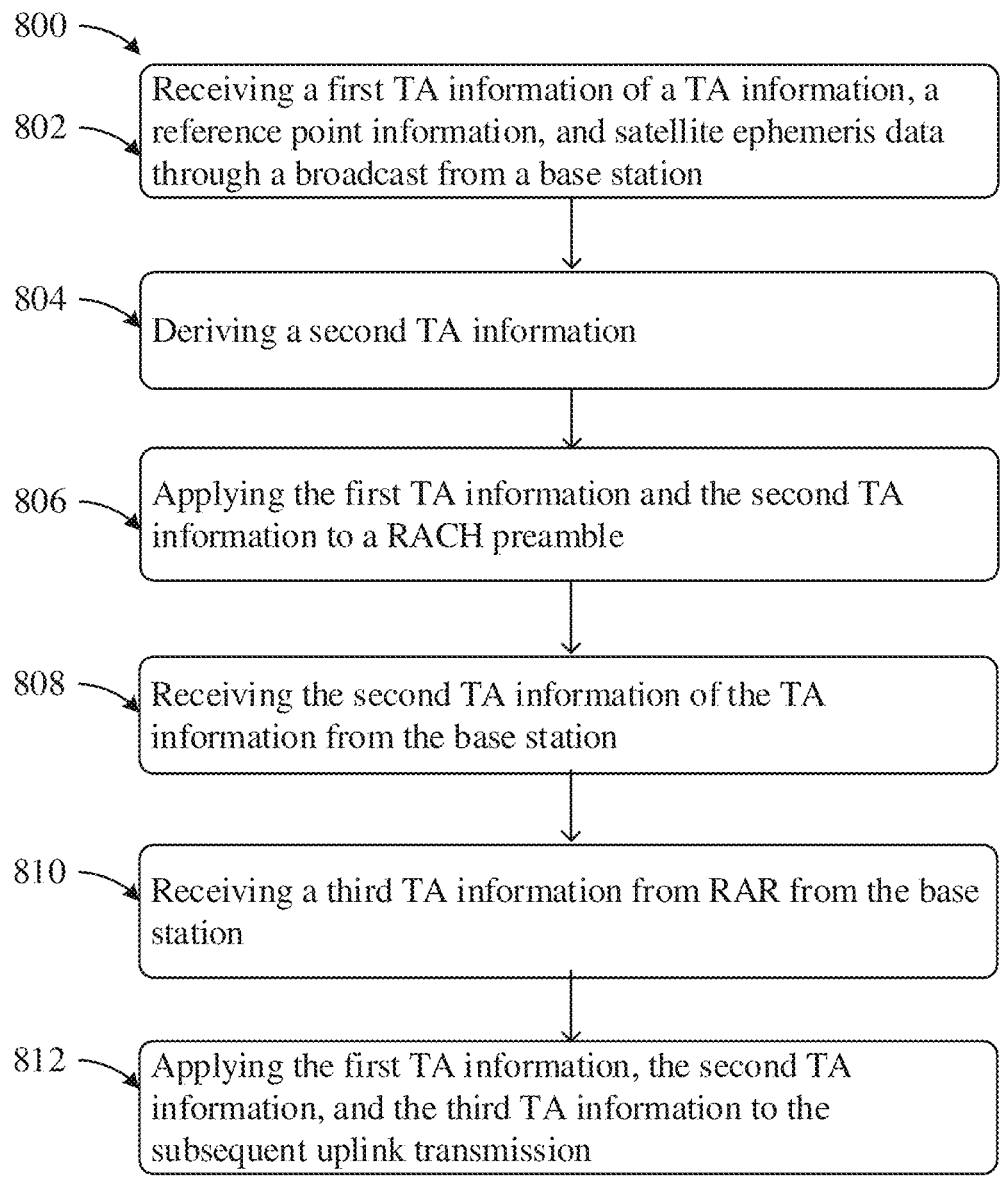
FIG. 7 is a flowchart illustrating a method of a timing advance (TA) indication of a UE according to another embodiment of the present disclosure.

FIG. 7 illustrates a method 800 of a timing advance (TA) indication of a UE 10 according to another embodiment of the present disclosure. In some embodiments, the method 800 includes: a block 802, receiving a first TA information, a reference point information, and satellite ephemeris data through a broadcast from a base station, a block 804, deriving a second TA information, a block 806, applying the first TA information and the second TA information to a RACH preamble, a block 808, receiving the second TA information from the base station, a block 810, receiving a third TA information from RAR from the base station, and a block 812, applying the first TA information, the second TA information, and the third TA information to the subsequent uplink transmission. This can provide a suitable TA indication in a non-terrestrial network (NTN) system.

In some embodiments, the first TA information is associated with a timestamp. In some embodiments, the first TA information associated with the timestamp comprises multiple pairs of TA values and corresponding time intervals. An example of TA indication association with timestamp is provided as follows. Due to mobility of the satellite, even for a stationary UE, the TA will be varying during the time. Thus, advantageously, the base station 20 (such as gNB) can broadcast multiple first TA information with timestamp. For instance, the broadcasted first TA information can be {TA0, T0}, {TA1, T1}, {TA2, T2}. In this example, the base station 20 (such as gNB) broadcasts multiple pairs of TA values associated with multiple first TA information, the indicated TA value is associated with time instance, i.e. TA0 for time interval T0, and TA1 for time interval T1, and so on. Some embodiments assume that the UE 10 and the base station 20 (such as gNB) shares the same time clock, e.g. this can be done by GPS time synchronization. Thus, the UE 10 will apply TA0 if the present time is in T0, and switches to TA1 if the present time is in T1. Note that the time internal can have different precision, e.g. hours, minutes, second or even milliseconds. One example of time interval precision down to minutes can be T0=00:00-00:10; T1=00:11-00:21; T2=00:22-00:32, etc. Therefore, the time interval is every 10 minutes.

In some embodiments, the first TA information is associated with a timestamp and an auxiliary information suitable for one or more moving UEs of the UEs. In some embodiments, the auxiliary information comprises a beam index. In some embodiments, the beam index comprises a synchronization signal block (SSB) index, a channel state information reference signal (CSI-RS) resource index, or a reference signal. In some embodiments, the first TA information is associated with a timestamp and an auxiliary information, which is applicable when the UE moves. An example of TA indication association with timestamp and beam indication is provided as follows. The TA and timestamp indication are suitable for stationary UE. However, if the UE 10 is moving, the TA and timestamp indication might not always ensure a correct TA for the UE 10. To solve this issue, the base station 20 (such as gNB) can also provide some additional information for the UE 10 to check if the TA value is correct. One solution is that the base station 20 (such as gNB) can add beam indication in the TA and timestamp pair, e.g. {TA0, T0, Beam0}, {TA1, T1, Beam0}, {TA2, T2, Beam0}, {TA0, T0, Beam1}, {TA1, T1, Beam1}, {TA2, T2, Beam1}, {TA0, T0, Beam2}, {TA1, T1, Beam2}, {TA2, T2, Beam2}, and so on, where the beam indication restricts a TA applicable space is for a given beam index. For example, in the broadcast TA formation, the base station 20 (such as gNB) indicates {TA0, T0, Beam0}, {TA1, T1, Beam0}, {TA2, T2, Beam0}, {TA0, T0, Beam1}, {TA1, T1, Beam1}, {TA2, T2, Beam1}, {TA0, T0, Beam2}, {TA1, T1, Beam2}, {TA2, T2, Beam2}, and so on. This information is similar to that of example 3 except for the additional beam index.

Thus, the beam indication is to tell UE 10 in a given time interval the UE is able to receive a downlink transmission with the indicated beam. If the UE does not detect this beam it means that the UE 10 is moving out of the beam area. Therefore, the UE 10 uses the indicated TA in this time interval and the detected beam. The beam index can be SSB index or CSI-RS resource index or other reference signal.

In some embodiments, the second TA information is carried in a random access response (RAR). In some embodiments, the second TA information comprises residual TAs specific to the UEs. In some embodiments, the residual TAs specific to all of the UEs are different. In some embodiments, the residual TAs specific to all of the UEs are same. In some embodiments, the residual TAs specific to at least any two of the UEs are different. An example of residual TA specific to the UE 10 is provided. The TA indication associated with the first TA information illustrated in the above embodiments is the same TA (a common TA) for all the UEs 10. In reality, the UE 10 often experiences different RTT. Thus, the common TA can only compensate for the major part of the RTT and there is still some residual TA (i.e. the second TA information) that are specific to UE's position. This residual TA can be indicated in a random access response (RAR).

In some embodiments, the feedback is an explicit feedback or an implicit feedback. In some embodiments, the explicit feedback uses 1-bit to indicate that the indicated TA information is applied on the one or more of the UEs and the first TA information and the second TA information are not applied on the one or more of the UEs. In some embodiments, the implicit feedback uses different group of preamble sequences to indicate that the indicated TA information is applied on the one or more of the UEs and the first TA information and the second TA information are not applied on the one or more of the UEs. In some embodiments, where the UE 10 can report only 2nd TA information is applied but not the 1st TA information, etc. In some embodiments, where the UE 10 can report only 1st TA information is applied but not the 2nd TA information, etc. In some embodiments, where the UE 10 can report the 1st TA information and the 2nd TA information are applied, etc.

In some embodiments, in the NTN system, it may not happen that all of the UEs 10 are capable of receiving global positioning system (GPS) data (that is GNSS-UE). Thus, for a mixture of non-GNSS and GNSS UEs, the base station 20 (such as gNB) can further inform that all of the UEs 10 follow the TA indication sent by the base station 20 (such as gNB) or only non-GNSS UEs follow the TA indication; while GNSS UEs can estimate the TA based on their own received data from GPS. Position methods that may be used for the GNSS-UE include use of GNSS such as GPS, GLONASS, or Galileo and use of assisted GNSS (A-GNSS), where the GNSS-UE acquires and measures GNSS signals and/or computes a location estimate from the GNSS measurements.

In some embodiments, alternatively, the UE 10 can also report to the base station 20 if it has applied the indicated TA or an estimated TA by its own based on received GPS data. This feedback can be realized by different means, e.g. an explicit feedback with 1-bit ('0' refers to 'not-applied', '1' refers to 'applied'), or an implicit feedback by selecting different group of preamble sequences, e.g. group 1 preambles refer to 'not-applied', group 2 preambles refer to 'applied'.

Commercial interests for some embodiments are as follows. 1. providing a suitable TA indication in a non-terrestrial network (NTN) system. 2. providing a good communication performance. 3. providing a high reliability. 4. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 8:
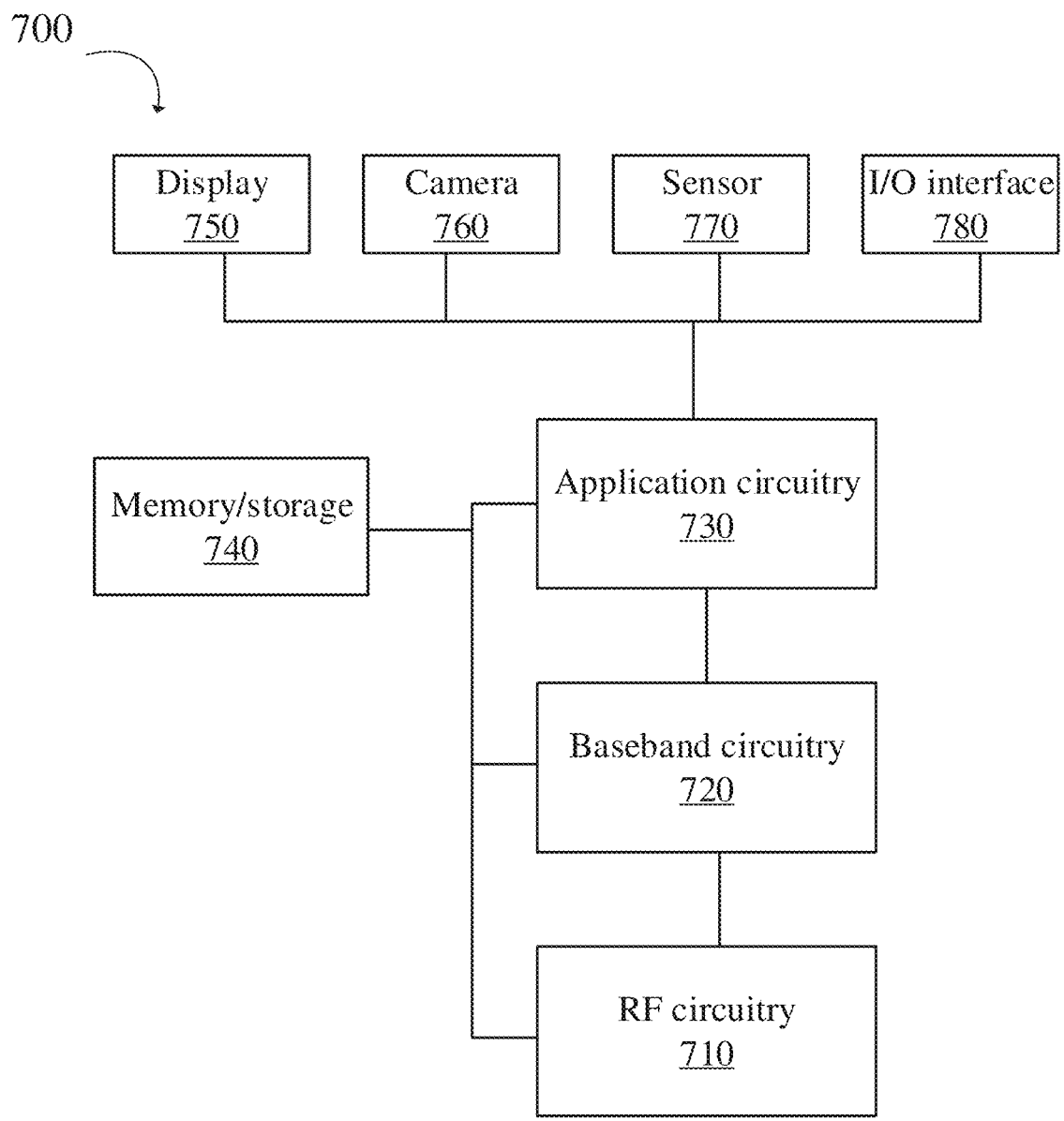
FIG. 8 is a block diagram of a system for wireless communication according to an embodiment of the present disclosure.

FIG. 8 is a block diagram of an example system 700 for wireless communication according to an embodiment of the present disclosure. Embodiments described herein may be implemented into the system using any suitably configured hardware and/or software. FIG. 8 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of a timing advance (TA) indication of a base station, comprising:
   determining a first TA information; and
   transmitting, to user equipments (UEs), the first TA information through broadcast,
   wherein the first TA information comprises TA values, and each of the TA values corresponds to each of a plurality of pre-defined time granularities.

2. The method of claim 1, wherein the first TA information indicates a same TA to at least two of the UEs;
   wherein each of the TA values comprises a time length of TA.

3. The method of claim 1, wherein each of the TA values equals to: N times Ts, where N is the number and Ts is the time granularity, N being an integer greater than or equal to 0.

4. The method of claim 1, wherein the first TA information comprises a location of the base station;
   wherein the first TA information comprises an auxiliary information associated to the location of the base station;
   wherein the auxiliary information comprises satellite ephemeris data;
   wherein the first TA information is broadcasted using a cell specific indication;
   wherein each TA value respectively corresponds to a time interval.

5. The method of claim 1, further comprising indicating, to the UEs, a second TA information;
   wherein the second TA information is carried in a random access response (RAR);
   wherein the second TA information comprises residual TAs specific to the UEs;
   wherein the residual TAs specific to at least two of the UEs are different.

6. The method of claim 5, further comprising informing one or more non-global navigation satellite system (non-GNSS) UEs of the UEs to apply the first TA information and the second TA information;
   wherein the method further comprises receiving a feedback that the indicated TA information is applied on one or more of the UEs form the one or more of the UEs;
   wherein the feedback is an explicit feedback or an implicit feedback;
   wherein the explicit feedback uses 1-bit to indicate that the indicated TA information is applied on the one or more of the UEs and the first TA information and the second TA information are not applied on the one or more of the UEs;
   wherein the implicit feedback uses different group of preamble sequences to indicate that the indicated TA information is applied on the one or more of the UEs and the first TA information and the second TA information are not applied on the one or more of the UEs.

7. A base station of a timing advance (TA) indication, comprising:
   a memory;
   a transceiver; and
   a processor coupled to the memory and the transceiver;
   wherein the processor is configured to:
   determine a first TA information; and
   control the transceiver to transmit, to user equipments (UEs), the first TA information through broadcast,
   wherein the first TA information comprises TA values, and each of the TA values corresponds to each of a plurality of pre-defined time granularities.

8. A method of a timing advance (TA) indication of a user equipment (UE), comprising:
   receiving a first TA information from a base station through broadcast; and
   applying the first TA for random access channel (RACH) preamble transmission,
   wherein the first TA information comprises TA values, and each of the TA values corresponds to each of a plurality of pre-defined time granularities.

9. The method of claim 8, wherein the first TA information indicates a same TA;
   wherein each of the TA values comprises a time length of TA.

10. The method of claim 8, wherein each of the TA values equals to: N times Ts, where N is the number and Ts is the time granularity, N being an integer greater than or equal to 0.

11. The method of claim 8, wherein the first TA information comprises a location of the base station;
   wherein the first TA information comprises an auxiliary information associated to the location of the base station;
   wherein the auxiliary information comprises satellite ephemeris data;
   wherein the first TA information is broadcasted using a cell specific indication.

12. The method of claim 8, wherein each TA value respectively corresponds to a time interval.

13. The method of claim 8, wherein the first TA information further comprises:
   one or more time intervals, and corresponding relation between one or more TA values and the one or more time intervals;
   wherein the first TA information further comprises an auxiliary information, which is applicable when the UE moves;
   wherein the auxiliary information corresponds to at least one of: the one or more TA values, or the one or more time intervals.

14. The method of claim 13, wherein the auxiliary information comprises beam information;
   wherein the beam information comprises at least one of:
   a beam identifier;
   a synchronization signal block (SSB) identifier;
   a channel state information reference signal (CSI-RS) resource identifier; and
   a reference signal.

15. A user equipment (UE) of a timing advance (TA) indication, comprising:
   a memory;
   a transceiver; and
   a processor coupled to the memory and the transceiver;
   wherein the processor is configured to:
   receive a first TA information from a base station through broadcast; and
   apply the first TA for random access channel (RACH) preamble transmission,
   wherein the first TA information comprises TA values, and each of the TA values corresponds to each of a plurality of pre-defined time granularities.

16. The UE of claim 15, wherein the first TA information indicates a same TA;
   wherein each of the TA values comprises a time length of TA.

17. The UE of claim 15, wherein each of the TA values equals to: N times Ts, where N is the number and Ts is the time granularity, N being an integer greater than or equal to 0.

18. The UE of claim 15, wherein the first TA information comprises a location of the base station;
   wherein the first TA information comprises an auxiliary information associated to the location of the base station;
   wherein the auxiliary information comprises satellite ephemeris data;
   wherein the first TA information is broadcasted using a cell specific indication;

wherein each TA value respectively corresponds to a time interval.

19. The UE of claim 15, wherein the processor is further configured to control the transceiver to receive a second TA information from the base station;
  wherein the second TA information is carried in a random access response (RAR);
  wherein the second TA information comprises a residual TA specific to the UE.

20. The UE of claim 19, wherein the processor is further configured to control the transceiver to receive an indication to request the UE to apply the first TA information and the second TA information when the UE is a non-global navigation satellite system (non-GNSS) UE;
  wherein the processor is further configured to control the transceiver to transmit, to the base station, a feedback that the indicated TA information is applied on the UE;
  wherein the feedback is an explicit feedback or an implicit feedback;
  wherein the explicit feedback uses 1-bit to indicate that the first TA information and the second TA information are applied the UE and the first TA information and the second TA information are not applied on the UE;
  wherein the implicit feedback uses different group of preamble sequences to indicate that the indicated TA information is applied on the UE and the first TA information and the second TA information are not applied on the UE.

* * * * *